May 4, 1965
R. V. PETERSON
3,181,516
INTERNAL COMBUSTION ENGINE
Filed Dec. 23, 1963
3 Sheets-Sheet 1
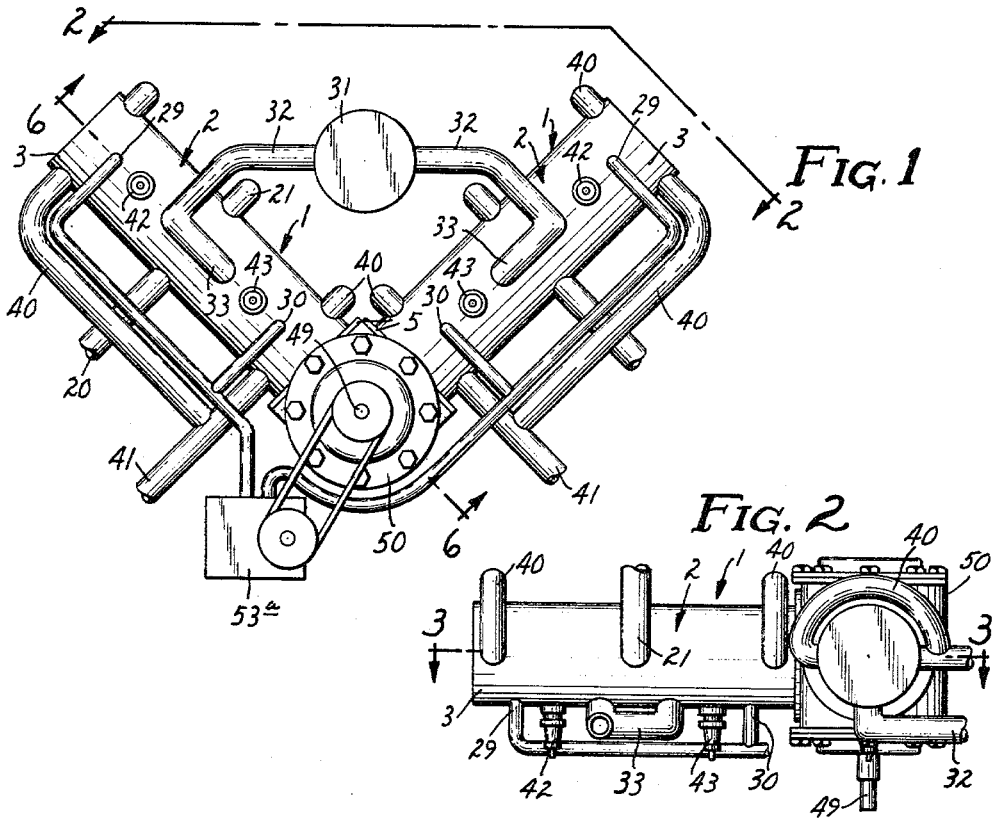
Fig. 1
Fig. 2
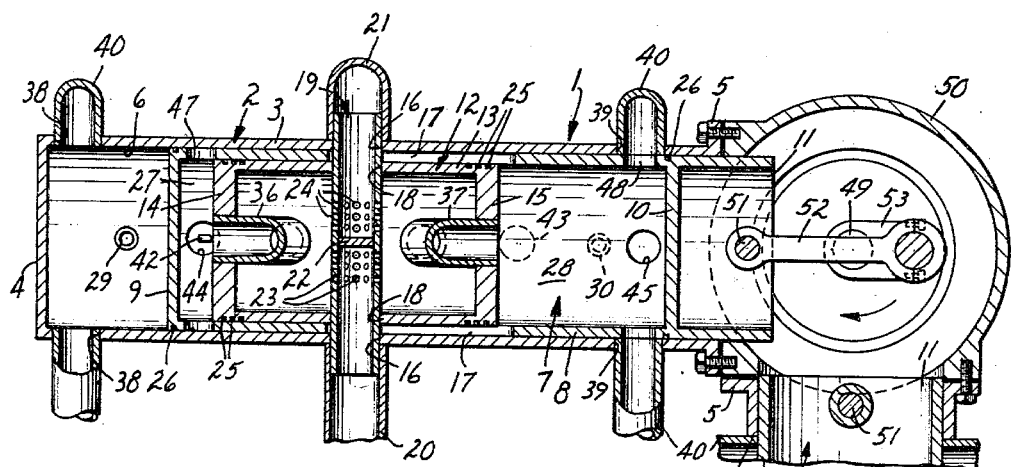
Fig. 3
INVENTOR.
RUBEN V. PETERSON
BY
Merchant, Merchant & Gould
ATTORNEYS INVENTOR.
RUBEN V. PETERSON
BY
Merchant, Merchant & Gould
ATTORNEYS

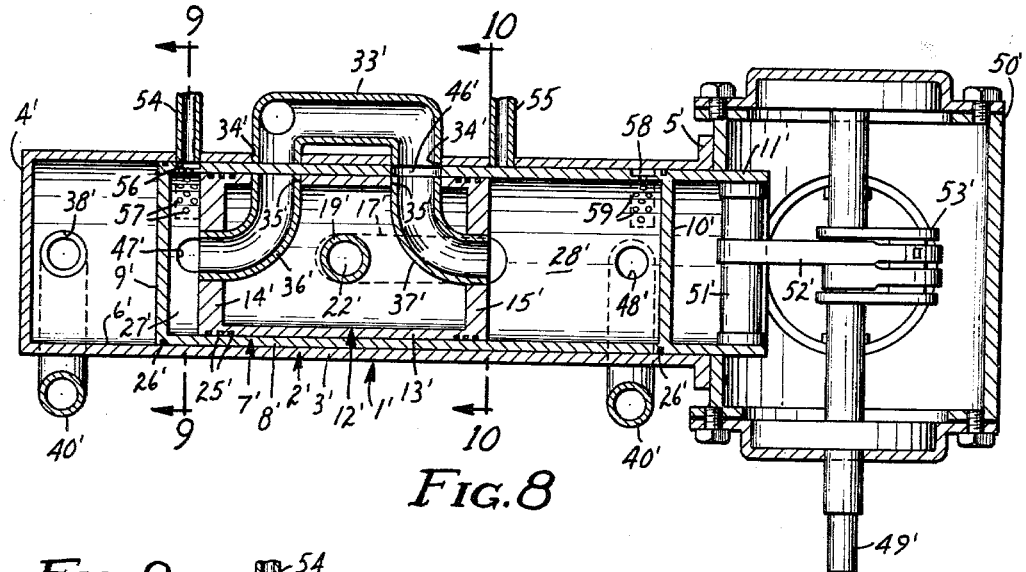
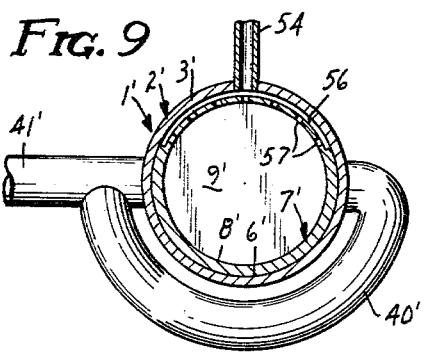
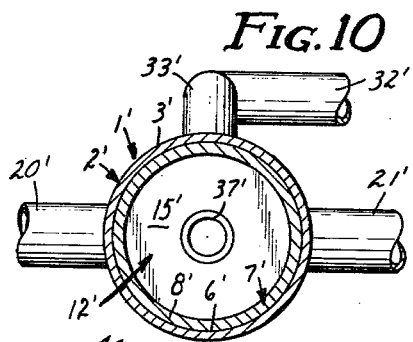
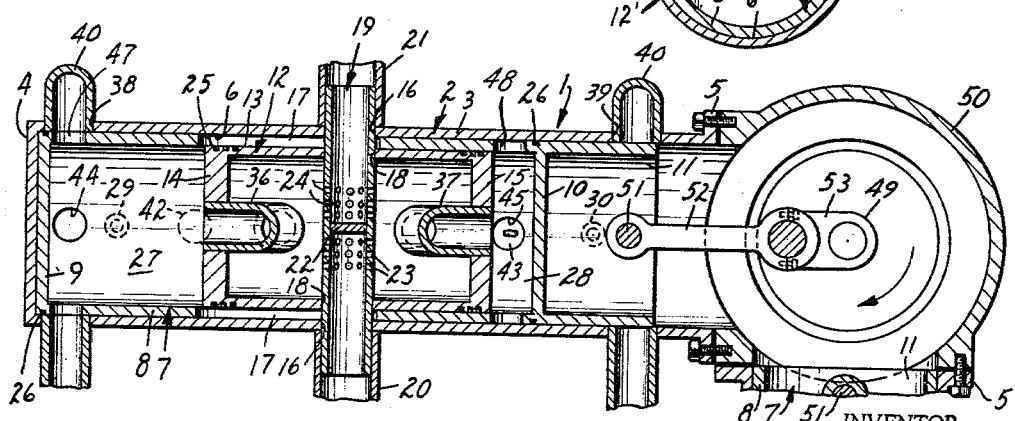

United States Patent Office 3,181,516
Patented May 4, 1965

3,181,516
INTERNAL COMBUSTION ENGINE
Ruben V. Peterson, 801 Cedar Ave., Albert Lea, Minn.
Filed Dec. 23, 1963, Ser. No. 332,724
7 Claims.  (Cl. 123—41.82)

This invention relates generally to internal combustion engines, and more particularly it relates to a uniquely constructed internal combustion engine having a reciprocating cylinder and a fixed piston positioned within the cylinder.

Generally speaking, the internal combustion engine of the present invention comprises a tubular elongated block, a tubular reciprocating cylinder fit within the block and adapted for connection to a member to be driven, a fixed piston within the cylinder, the cylinder with the piston defining a pair of combustion chambers at opposite end portions thereof, and air and fuel inlet means with valve means therefor suitably arranged to produce a power impulse with each reciprocating stroke of the cylinder.

An important object of the present invention is the provision of the one-stroke (one cycle) cycle internal combustion engine or power unit which provides a power impulse for each stroke of the reciprocating cylinder so as to provide two power impulses per revolution of a crank-shaft to which the cylinder may be connected.

Another object of the present invention is the provision of a one-cycle internal combustion engine of the type noted above which includes novel means for circulating a coolant through the interior of the hollow fixed piston.

Another object of the present invention is the provision of an internal combustion engine of the class noted above which is particularly designed to provide little unbalance because of the power impulse produced at each end of the cylinder stroke.

A further object of the present invention is the provision of an internal combustion engine of the class noted above in which the power of the engine may be easily increased merely by adding one power unit to another, either in circumferentially spaced relationship about a crank-shaft or in axially spaced relationship with respect to the shaft.

A still further object of the present invention is the provision of an internal combustion engine of the type noted above which may be easily modified to operate as a compression-ignition engine for operation on the diesel cycle.

Still further objects and advantages of the present invention reside in the provision of an internal combustion engine of the type noted above which provides increased efficiency in its manufacture and operation, which is simple in its operation and which may be economically produced.

The above and still further objects and advantages of the present invention will become apparent from a consideration of the following details of the specification, attached claims and appended drawings.

Referring to the drawings, wherein like reference characters indicate like parts or elements throughout the several views:

FIG. 1 is a view in front elevation showing two of my novel power units connected together as an internal combustion engine;

FIG. 2 is a plan view as seen from the line 2—2 of FIG. 1, and essentially showing the power unit on the right side of FIG. 1 in top plan and the power unit on the left side of FIG. 1 in side elevation, some parts being eliminated;

FIG. 3 is an enlarged view in section taken on the line 3—3 of FIG. 2, some parts being broken away;

Figure 4:
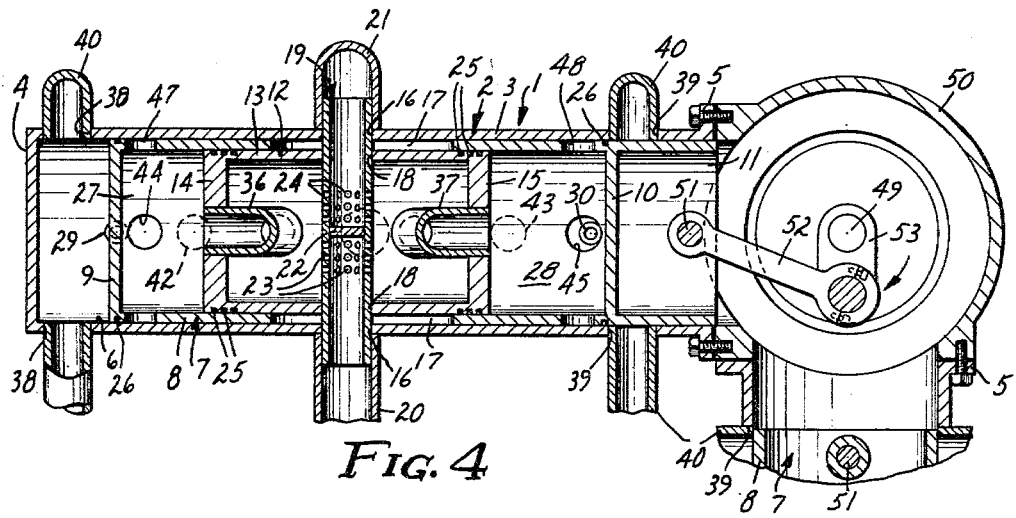
FIG. 4 is a view similar to FIG. 3 but showing a different position of some parts thereof, the crank-shaft of the engine being rotated 90° with respect to the position shown in FIG. 3.
Figure 6:
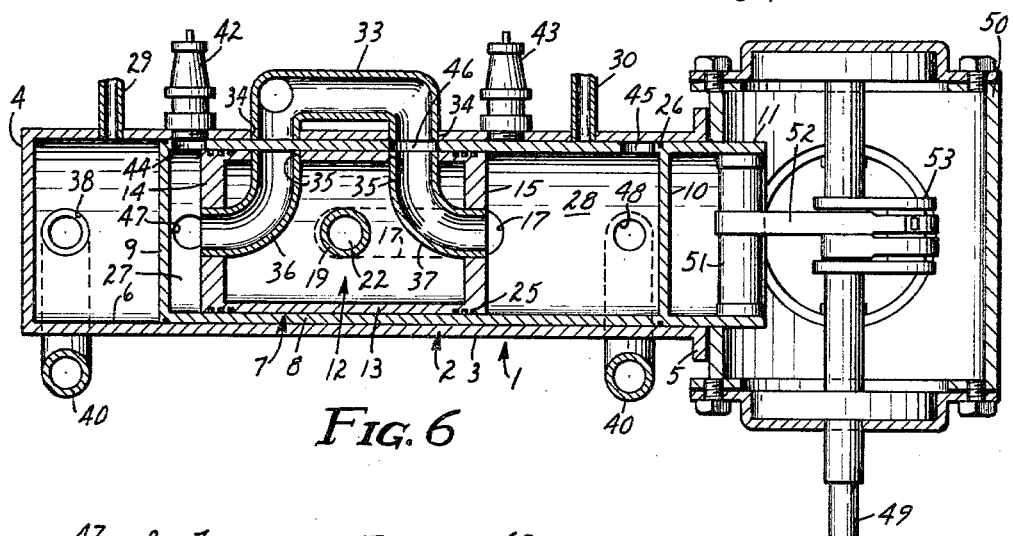
Figure 7:
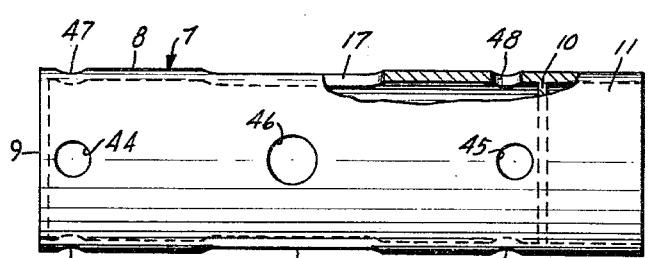

FIG. 5 is a view similar to FIGS. 3 and 4, but showing a still different position of some parts thereof, the crank-shaft being rotated a further 90° from that shown in FIG. 4 and 180° from that shown in FIG. 3;

FIG. 6 is an enlarged view in section taken along the line 6—6 of FIG. 1, with the movable parts positioned as shown in FIG. 3;

FIG. 7 is a view in side elevation of the reciprocating cylinder, some parts thereof being broken away and some parts being shown in section;

FIG. 8 is a view in section corresponding to FIG. 6, but showing a modified form of the present invention;

FIG. 9 is a view in section taken on the line 9—9 of FIG. 8; and

FIG. 10 is a view in section taken on the line 10—10 of FIG. 8.

In describing the figures of the drawings, the terms "top" plan, "side" elevation, etc., are used only for convenience of orientation and description, and are not intended to limit the present invention.

Referring to the drawings, the single internal combustion engine or power unit 1 of the present invention will be initially described. The internal combustion engine or power unit 1 noted above comprises an elongated generally tubular block, represented generally by the reference numeral 2, and having a central axis. The block 2 includes a cylindrical wall portion 3 and an outer end wall 4 enclosing the outer end thereof; and the open inner end portion of the block 2 defines a radially extending flange 5 adapting the power unit 1 for connection to the case of a member to be driven, as will be particularly described hereinafter. The inner cylindrical surface of the block 2 is represented by the reference numeral 6. The power unit 1 further comprises a generally tubular elongated reciprocating cylinder, represented generally by the reference numeral 7, coaxially fit or positioned within the block 2. The reciprocating cylinder 7 comprises a cylindrical wall portion 8 having an outer surface portion generally equal in diameter to the inner surface portion 6 of the block 2. The outer end of the reciprocating cylinder 7 is enclosed by an outer end wall 9, and the inner end portion of the cylinder 7 is enclosed by an inner end wall or partition 10, the inner end portion of the cylinder 7 extending inwardly beyond the partition 10 to define a cylindrical skirt 11.

An important feature of the present invention is the provision of a fixed piston, represented generally by the reference numeral 12, positioned within the reciprocating cylinder 7 generally intermediate the opposite end portions thereof, as shown particularly in FIGS. 3-6. The fixed piston 12 is hollow and comprises a cylindrical wall 13, an outer end wall 14, and an inner end wall 15. As shown particularly in FIGS. 3-5 of the drawings, the block 2 defines a pair of diametrically opposed and aligned generally coaxial openings 16 generally longitudinally centered with respect to the block 2 for general transverse alignment with the transverse center of the fixed piston 12. The reciprocating cylinder 7 also defines a pair of generally diametrically opposed and aligned axially elongated apertures 17 which are also aligned with the openings 16 in the block 2 and the apertures 17 and the cylinder 7 are of a length greater than the stroke of the reciprocating cylinder 7. As shown particularly in FIGS. 3 and 4, the fixed piston 12 defines a pair of generally diametrically opposed coaxial openings 18 which are aligned with the openings 16 in the block 2. A generally tubular stud, represented generally by the reference numeral 19, projects through the piston 12 and is secured in the aligned openings 16, 18 in the block 2 and the piston 12, respectively. The generally tubular stud 19 has an outer diameter generally corresponding to the inner diameters of the openings 16, 18, and the stud 19 secures the fixed piston 12 with respect to the block 2. It is noted that the joints between the stud 19 and the openings 16, 18 and the block 2 and the piston 12 are suitably sealed for accomodating the requisite pressures. Also, the adjacent openings 16, 18 and apertures 17 are circumferentially spaced for diametric or axial alignment, the apertures 17 in the cylinder 7 permitting reciprocation thereof.

The generally tubular stud 19 is adapted for connection to a suitable pump or the like, not shown, for recirculating a coolant through the interior of the piston 12, and for this purpose, an inlet conduit 20 is connected to one projecting end portion of the stud 19 and an outlet conduit 21 is connected to the other projecting end portion of the stud 19. The stud 19 defines an intermediate partition wall 22 and a plurality of apertures 23, sometimes referred to herein as outlet apertures, for directing the coolant, heat transfer oil for example, into the interior of the piston 12. The outlet apertures 23 are positioned on the inlet side of the partition wall 22, and on the other side thereof, a plurality of inlet apertures 24 are located for permitting the re-entry of the recirculating coolant into the passageway of the tubular stud 19. It is further noted that the fixed piston 12 is provided with suitable rings 25 adjacent each end portion thereof, and the reciprocating cylinder 7 is also provided with a compression ring 26 adjacent each end portion of the same.

As shown particularly in FIGS. 3-4, the reciprocating cylinder 7 with the fixed piston 12 defines a pair of combination chambers 27, 28, the chamber 27 being disposed adjacent the outer end portion of the cylinder 7 and the chamber 28 being disposed adjacent the inner end portion thereof. Referring to FIGS. 3-6, it will be noted that the block 2 of the engine or power unit 1 defines or is provided with a fuel inlet 29 for the chamber 27 and a similar fuel inlet 30 is provided for the combustion chamber 28. A timed fuel injection system is utilized, as will be more particularly described hereinafter. The engine or power unit 1 of the present invention also comprises novel air inlet means for the combustion chambers 27, 28, the same comprising a blower or supercharger 31 for pressurizing the injection of the air into the chambers 27, 28 through the fixed piston 12. Referring to FIGS. 1 and 6, the supercharger 31 is connected by suitable piping 32 to a split Y or T conduit 33 which connects with a pair of spaced openings 34 in the block 2 and aligned spaced openings 35 in the piston 12. The corresponding openings 35 in the cylinder wall 13 of the piston 12 are connected by elbow conduits 36, 37 which turn in axially opposed directions and open into the corresponding combustion chambers 27, 28 through the end walls 14, 15 of the piston 12. The block 2 of the engine or power unit 1 also defines a pair of diametrically opposed exhaust ports 38 located adjacent the combustion chamber 27 and a further pair of exhaust ports 39 located adjacent the combustion chamber 28. The corresponding pairs of exhaust ports 38, 39 are connected by arcuate bypass tubes 40 and in turn connected to a common exhaust manifold 41, as shown in FIG. 1. The exhaust ports 38 are longitudinally positioned to be transversely adjacent to the chamber 27 at a time generally corresponding to the end of the outer stroke of the reciprocating cylinder 7 and the exhaust ports 39 are positioned or longitudinally spaced to be generally transversely adjacent the combustion chamber 28 when the reciprocating cylinder reaches the generally innermost position of its stroke.

The fuel inlet 29 for the chamber 27 is positioned longitudinally inwardly from the exhaust ports 38 toward the generally centrally located piston 12, and the fuel inlet 30 for the chamber 28 is similarly positioned in inwardly spaced relationship from the exhaust ports 39 towards the piston 12. Ignition means is provided for each of the combustion chambers 27, 28 for alternately igniting the charge of air and fuel in each of the chambers 27, 28 to produce a power impulse with each stroke of the reciprocating cylinder 7. The above referred to ignition means preferably, and as shown, comprises a pair of spark plugs 42, 43, respectively provided with suitable ignition timing or distributor mechanism, not shown. As shown in the drawings, the spark plugs 42, 43 are located axially of the power unit 1 in inwardly spaced relationship to the respective fuel inlets 29, 30. More particularly, the spark plug 42 is positioned generally adjacent the end wall 14 of the piston 12 so as to be generally transversely adjacent to the innermost position of the reciprocating cylinder 7 with respect to the combustion chamber 27, and the spark plug 43 is similarly located adjacent the inner end wall 15 of the piston 12.

The reciprocating cylinder 7 defines first valve means for each of the combustion chambers 27, 28 for introducing air and the fuel from the respective air and fuel inlet means alternately into one of the combustion chambers 27, 28 and then into the other thereof, and the cylinder 7 also defines second valve means for each of the combustion chambers 27, 28 for exhausting the same to the associated block exhaust ports 38 or 39. The first valve means mentioned above comprises a valve inlet port 44 for the combustion chamber 27 and a valve inlet port 45 for the combustion chamber 28, both thereof being circumferentially disposed in axial alignment with one another and also in axial alignment with the fuel inlets 29, 30 and the spark plugs 42, 43, respectively. The cylinder 7 also defines in its wall portion 8 an air inlet port 46 which alternately aligns with one and then the other of the openings 34 in the block 2. The second valve means mentioned above comprises a pair of diametrically opposed exhaust ports 47 for the combustion chamber 27 which are adapted to align with the exhaust ports 38 in the block 2, and a second pair of exhaust ports 48 for the combustion chamber 28 which are adapted to align with the exhaust ports 39 defined in the opposite end portion of the block 2. It is noted that the exhaust ports 47, 48 are circumferentially spaced (for example 90°, as shown) from the corresponding valve inlet ports 44, 45.

Having described the individual engine or power unit 1, it will be further noted that the reciprocating cylinder 7 is adapted for connection to a member to be driven, and as shown in the drawings, the same is illustrated as a crank-shaft 49 housed within a suitable crank-case 50. The reciprocating cylinder 7 of the power unit 1 is connected by means of a transverse wrist pin 51, a connecting rod 52, and a crank throw 53.

As shown particularly in FIG. 1, the power units 1 may be combined with respect to a crank-shaft 49 with the supercharger 31 conveniently located between the power units, and the fuel injector pump 53a may be conveniently driven from the crank-shaft 49 by suitable driving mechanism, specifically shown as comprising a pair of sprockets and cooperating chain. Suitable fuel lines then lead from the injector pump 53a to the fuel inlets 29 and 30 for the power units 1. It should be further noted that cooling means, in addition to the recirculating coolant for the interior of the piston 12, may be provided in the form of air cooled fins or a liquid cooled jacket, not shown, for the exterior of the block 2. It will be appreciated that a novel engine or power unit 1 has been disclosed herein which may be easily combined or multiplied with additional power units for providing internal combustion engines of various sizes and power. Referring to FIG. 3, it will be noted that with the pair of power units 1, four power impulses will be provided to the crank-shaft 49 per each revolution thereof. If four power units 1 were to be spaced at 90° about the crank-shaft 49, eight power impulses would then be provided per revolution of the crank-shaft, and the same would of course be doubled by locating the power units 1 at 45° spacing.

Further, the power units 1 may be suitably positioned axially of the crank-shaft 49.

*Operation of device of FIGS. 1-7*

In order to explain the operation of the novel engine or power unit 1 disclosed herein, the operational sequence will be hereinafter described for one complete stroke of the reciprocating cylinder 7 with respect to the piston 12. Starting with the position shown in FIGS. 3 and 6, wherein the reciprocating cylinder 7 is at the extreme inner end of its stroke, the fuel and air charge in the combustion chamber 27 has just finished the compression stroke and is being ignited by the spark plug 42 since the inlet port 44 is aligned with the plug 42; and the combustion chamber 28 has completely expanded from its firing and the exhaust ports 48 in the cylinder wall portion 8 are in alignment with the block exhaust ports 39, and the air inlet port 46 is in position to permit air to be blown into the chamber 28 to completely exhaust the same.

Now referring to FIG. 4, wherein the crank-shaft 49 is rotated throughout 90°, corresponding to one-half stroke of the cylinder 7, the combustion chamber 27 is now expanding from its previous firing so as to compress the combustion chamber 28. At the position shown, the valve inlet port 45 for the chamber 28 is in alignment with the fuel inlet 30 for the injection of fuel into the chamber 28. Continued movement of the reciprocating cylinder 7 in the same direction will move the inlet port 45 for the chamber 28 toward the corresponding spark plug 43 and in the position shown in FIG. 5 of the drawings, the air and fuel charge has been completely compressed in the chamber 28 and the inlet port 45 is in alignment with the spark plug 43 for ignition. Of course, in the combustion chamber 27, the exhaust ports 47 in the cylinder 7 have become aligned with the exhaust ports 38 in the block 2 for exhausting the chamber 27. Again, the air inlet port 46 has moved to a position in alignment with the air opening leading to the elbow 36 to permit the entry of air from the supercharger 31 for exhausting the combustion chamber 27. In this position, the crankshaft has rotated another 90° from that shown in FIG. 4 to complete a full stroke of the reciprocating cylinder 7 from that shown in FIG. 3, and the cylinder 7 begins its return stroke wherein the above described sequence of operation is repeated.

*Alternative embodiment of FIGS. 8-10*

A modified embodiment of the present invention is shown in FIGS. 8-10 of the drawings, which discloses a modification of the present engine or power unit 1 for use as a compression-ignition engine operating on the diesel cycle. It will be noted that all parts or elements of the modified embodiment shown in FIGS. 8-10 of the drawings which correspond to like parts or elements of the embodiment described in FIGS. 1-7 will be given like reference characters in FIGS. 8-10 with prime marks added thereto.

As shown in FIG. 8, the spark plugs are eliminated in the present compression-ignition modification of this invention, and fuel inlets 54, 55 for the respective combustion chambers 27', 28', are placed generally in the position of the spark plugs 42, 43 of the embodiment shown in FIGS. 1-7. The fuel inlet valve means for the combustion chamber 27' comprises a circumferentially extending outwardly opening slot 56 defined in the wall portion 8' of the reciprocating cylinder 7'. The generally intermediate portion of the slot 56 is adapted for alignment with the fuel inlet 54, as shown particularly in FIG. 9. Said inlet valve port means for the chamber 27' further comprises a plurality of generally radially extending spaced apertures 57 defined in the wall portion 8' of the cylinder 7' and leading from the slot 56 into the adjacent combustion chamber 27'. Of course, the combustion chamber 28' is provided with a similar slot 58 and spaced apertures 59. The above-noted construction for the fuel inlet means to the combustion chambers 27' and 28' is provided for more effectively distributing the fuel charge to the respective chambers 27' and 28'. Since the operation and stroke sequence is generally the same for this embodiment of the present invention as that described in detail with respect to the embodiment shown in FIGS. 1-7, a detailed written description of the operational sequence will not be repeated, particularly since the same is easily ascertainable from the drawings.

While I have shown and described a preferred embodiment, I wish it to be specifically understood that the same is capable of modification without departure from the spirit and scope of the appended claims.

What I claim is:
1. In an internal combustion engine:
   (a) a generally tubular elongated block having a central axis,
   (b) a generally tubular elongated reciprocating cylinder fit within said block and coaxial therewith and adapted for connection to a member to be driven,
   (c) a fixed piston positioned within said cylinder generally intermediate the opposite ends thereof and secured to said block through openings in said cylinder,
   (d) said cylinder with said fixed piston defining a pair of combustion chambers each one located within said cylinder and adjacent a different end portion thereof,
   (e) air inlet means and fuel inlet means for each of said combustion chambers, said air inlet means comprising:
      (1) a supercharger, and
      (2) conduit means extending from the supercharger through said block, cylinder and piston to both of the opposite end portions of said piston, said conduit means at both end portions of said piston opening into both of said combustion chambers, and
   (f) said cylinder defining valve means for each of said combustion chambers for introducing air and fuel from said respective air and fuel inlet means alternately into one of said combustion chambers and then into the other thereof to produce upon ignition a power impulse with each stroke of said cylinder.

2. In an internal combustion engine:
   (a) a generally tubular elongated block having a central axis, said block defining a pair of diametrically opposed and aligned generally longitudinally centered coaxial openings,
   (b) a generally tubular elongated reciprocating cylinder fit within said block and coaxial therewith and adapted for connection to a member to be driven, said cylinder defining a pair of generally diametrically opposed and aligned axially elongated apertures also aligned with the openings in said block and longer than the stroke of said reciprocating cylinder,
   (c) a fixed piston positioned within said cylinder generally intermediate the opposite ends thereof, said piston being hollow and defining a pair of generally diametrically opposed coaxial openings aligned with the openings in said block,
   (d) a generally tubular stud projecting through said piston and secured in said aligned openings in said block and said piston and said stud securing said piston with respect to said block, said stud having an intermediate partition and outlet apertures to the interior of said piston on one side of said partition and inlet apertures on the other side of said partition, and
   (e) means for circulating a coolant through said tubular stud and the interior of said hollow piston.

3. In an internal combustion engine:
   (a) a generally tubular elongated block having a central axis, (b) a generally tubular elongated reciprocating cylinder fit within said block and coaxial therewith and adapted for connection to a member to be driven,
(c) a fixed piston positioned within said cylinder generally intermediate the opposite ends thereof and secured to said block through openings in said cylinder,
(d) said cylinder with said fixed piston defining a pair of combustion chambers each one located within said cylinder and adjacent a different end portion thereof,
(e) adjacent each of said combustion chambers, said engine having:
  (1) an exhaust port defined in the engine block and disposed adjacent the associated end portion thereof,
  (2) fuel inlet means defined in the engine block and disposed longitudinally inwardly of said exhaust port, and
  (3) air inlet means entering the associated combustion chambers through said fixed piston,
(f) said cylinder defining first valve means for each of said combustion chambers for introducing air and fuel from the respective air and fuel inlet means alternately into one of said combustion chambers and then into the other thereof and also defining second valve means for each of said combustion chambers for exhausting the same to the associated block exhaust port, and
(g) ignition means associated with each of said combustion chambers for alternately igniting the charge of air and fuel in each of said combustion chambers to produce a power impulse with each stroke of said cylinder, said ignition means for each of said chambers being disposed axially inwardly of the associated fuel inlet means.

4. The structure defined in claim 3 in which:
(1) said fuel and air inlet means are axially aligned,
(2) said first valve means for each of said combustion chambers comprises first and second inlet valve ports defined in said cylinder and circumferentially aligned with both said fuel air inlet means and said air inlet means,
(3) said second valve means for each of said combustion chambers comprises a valve exhaust port defined in said cylinder and circumferentially aligned with said block exhaust opening.

5. The structure defined in claim 3 in which said air inlet means for said combustion chambers comprises a pair of generally L-shaped conduits having inlet end portions located in axially spaced relation in the side of said piston and outlet end portions located in the opposite ends of said piston, and in which said first valve means includes a valve port defined in said cylinder and circumferentially aligned with said conduit inlet end portions, and said valve port being alternatively aligned with a different one of siad conduit inlet end portions upon reciprocation of said cylinder.

6. In an internal combustion engine of the compression ignition type:
(a) a generally tubular elongated block having a central axis, said block defining a pair of diametrically opposed and aligned generally longitudinally centered coaxial openings,
(b) a generally tubular elongated reciprocating cylinder fit within said block and coaxial therewith and adapted for connection to a member to be driven, said cylinder defining a pair of generally diametrically opposed and aligned axially elongated apertures also aligned with the openings in said block and longer than the stroke of said reciprocating cylinder,
(c) a fixed piston positioned within said cylinder generally intermediate the opposite ends thereof, said piston being hollow and defining a pair of generally diametrically opposed coaxial openings aligned with the openings in said block,
(d) a generally tubular stud projecting through said piston and secured in said aligned openings in said block and said piston and said stud securing said piston with respect to said block, said stud having an intermediate partition and outlet apertures to the interior of said piston on one side of said partition and inlet apertures on the other side of said partition, and
(e) means for circulating a coolant through said tubular stud and the interior of said hollow piston.

7. In an internal combustion engine of the compression ignition type:
(a) a generally tubular elongated block having a central axis,
(b) a generally tubular elongated reciprocating cylinder fit within said block and coaxial therewith and adapted for connection to a member to be driven,
(c) a fixed piston positioned within said cylinder generally intermediate the opposite ends thereof and secured to said block through openings in said cylinder,
(d) said cylinder with said fixed piston defining a pair of combustion chambers each one located within said cylinder and adjacent a different end portion thereof,
(e) air inlet means and fuel inlet means for each of said combustion chambers, said fuel inlet means for each of said combustion chambers including a circumferentially extending generally radially outwardly opening slot defined in the wall of said cylinder and also including a plurality of spaced apertures extending from said slot generally radially into the adjacent combustion chamber.

References Cited by the Examiner

UNITED STATES PATENTS

| | | | |
|---|---|---|---|
| 1,079,307 | 11/13 | Ward | 123—50 |
| 1,120,533 | 12/14 | Pottenger | 123—50 |
| 1,432,596 | 10/22 | George | 123—50 |
| 1,533,926 | 4/25 | Larson | 123—50 |
| 1,734,345 | 11/29 | Recen | 123—75 |
| 2,024,263 | 12/35 | Young | 123—50 |

FRED E. ENGELTHALER, *Primary Examiner.*